United States Patent Office 2,705,050
Patented Mar. 29, 1955

2,705,050

SETTABLE DRILLING FLUID

Robert W. Davis, Richmond, Calif., and James L. Lummus, Tulsa, Okla., assignors to Stanolind Oil and Gas Company, Tulsa, Okla., a corporation of Delaware No Drawing. Application May 25, 1953,
Serial No. 357,378

10 Claims. (Cl. 166—31)

This invention relates to drilling fluids. More particularly, it relates to settable drilling fluids for stopping loss of circulation of drilling fluids to formations penetrated by wells.

Frequently, during drilling operations, a portion of the drilling fluid circulated in the bore hole to remove drill cuttings and to perform other functions is lost to some of the formations penetrated by the well. Thus, a part of the drilling fluid fails to return to the surface. This failure is normally referred to as loss of circulation. The drilling fluid can be lost to large pores, to naturally occurring cracks and crevices, or to fractures formed during the drilling operations. These types of openings can generally be sealed and further loss of drilling fluid prevented by any of several available additives. For example fibrous materials such as wood fibers or chicken feathers may be added to the drilling fluid to bridge the openings. Another type of substance usually found to be effective in such cases comprises thin platelike materials such as cottonseed hulls or cellophane. A type of substance recently found to be highly effective is a granular material such as ground set plastic or hard nutshells.

Some improvement is still desirable in sealing the larger pores or crevices to which drilling fluids are lost, but the principal problem remaining in stopping loss of circulation is loss to cavernous zones having openings larger than about ¼ inch since these cannot be readily sealed by the common fibrous, flaked, or granular materials. Some formations have passages of approximately the same size as the drill pipe or even larger, that is, three or four inches in average diameter. Obviously, it is difficult to place a material in the well through a drill pipe and have it seal a passage in the formation equal to or greater than the size of the pipe through which the material is conducted to the passage to be sealed. Cement has been deposited in the bottom of wells in an effort to seal such cavernous passages. Some success has been achieved by this means but several disadvantages are presented. For example, the cement flows about as readily as the drilling fluid, or nearly so. Thus, it is usually lost as readily as the drilling fluid. In addition, cement slurries characteristically develop no resistance to shear while moving. Therefore, there is little tendency of cement slurries to stop in the passages of cavernous formations. Even if the cement slurry stops in the passage, several hours are required for the cement to set. While considerable strength develops in 6 to 8 hours, sufficient strength to permit drilling the cement from the bottom of the well develops only after about 24 hours. Thus, valuable drilling time is lost. In addition, considerable time is required to drill the cement remaining in the bottom of the well. Also, mud contamination problems usually result from drilling out the cement.

In view of the above problems, it is an object of this invention to provide an improved method and composition for minimizing or stopping loss of drilling fluid to formations penetrated by wells during drilling operations. A more particular object is to provide a method and composition capable of sealing the larger openings through which drilling fluid is lost to formations during drilling operations. A still more particular object is to provide a composition which will minimize or stop loss of drilling fluid to formations by developing shear resistance while flowing through the passages to which drilling fluid is being lost. An additional object is to provide means for controlling the time at which the composition develops resistance to shear. Another object is to provide a means for increasing the strength of the composition employed for stopping loss of circulation.

In general, we accomplish the objects of our invention by preparing a lime base drilling fluid containing a critical amount of clay solids and a particular type of breakover material hereinafter more fully described. In the simplest embodiment, sufficient quicklime is added to this composition to increase the temperature of the latter to about 250° F. and the composition is placed quickly at the loss zone. The quicklime causes rapid gelation of the drilling fluid due to the heat and high lime content. If greater strength or a slight lowering of the temperature at which gelling occurs is desired, unhydrated cement is mixed into the drilling fluid before the addition of quicklime. The gelling rate can be controlled by adding boric acid or acetic acid, or both.

We believe the theory of our invention to be as follows, although it will be understood that we do not wish to be bound thereby. Apparently there is a reaction of the caustic and lime in the drilling fluid with the silicates in the clay solids at the high temperatures generated by hydration of the quicklime. This theory is supported by the data presented in World Oil, volume 134, March 1952, pp. 101, etc. However, such theory is not quite as simple as it might seem, as will be seen from consideration of the limitations on the various constituents of the composition.

The composition consists of a lime base drilling fluid prepared according to rather strict limitations, together with freshly added quicklime. The essential constituents of the drilling fluid are a water base, clay solids, hydrated lime, lignosulfonates as breakover materials, and caustic. To this drilling fluid cement may be added to increase the strength of the final set product. Boric acid, or a low molecular weight organic acid, or both, may also be added to control the setting or gelation time. The final constituent added is the quicklime. These nine ingredients may now be considered separately.

WATER BASE

The water base should be fresh water although up to about 1 per cent by weight of chlorides or other soluble salts may usually be present without serious effects. The amount of water employed is not critical, being simply the difference between 100 per cent and the total of all other ingredients. Normal practice is to prepare the drilling fluid composition from a natural mud containing both the water and clay solids. In these natural muds the clay solids may amount to as much as 20 per cent by weight, and weighting material may amount to an even larger quantity. It is greatly preferred to employ unweighted drilling fluids to avoid the large amounts of inert weighting materials, thus leaving a water content of around 80 per cent in the natural mud used as a base.

CLAY SOLIDS

The type of clay apparently is unimportant so far as setting or gelation of the composition is concerned. Apparently all the silicate type clays including montmorillonite, illite, kaolin, and attapulgite clays will gel upon the addition of caustic and quicklime so long as the drilling fluid contains at least about 5 per cent by weight of the clay solids. Normally, about 7 to about 15 per cent clay solids is preferred. About 25 per cent is the top limitation if the drilling fluid is to remain pumpable. This is particularly true of highly weighted drilling fluids in which the weighting material may amount to almost 40 per cent of the weight of the drilling fluid. Generally, an unweighted natural mud weighing about 9 to 10 pounds per gallon is preferred. If some doubt exists regarding the suitability of available drilling fluids the clay content can be checked by evaporating the fluid, measuring the density of the resulting solids and calculating the quantity of clay present after subtracting the amount of weighting material necessary to account for the density of the solids. In order to be absolutely certain of the composition, it is, of course, possible to prepare a base mud from water and known amounts of clay.

HYDRATED LIME

The amount of hydrated lime employed should be the usual 3 to 10 pounds per barrel employed to break over a sodium base drilling fluid to lime base. As in the preparation of most lime base drilling fluids, unhydrated cement can be employed as an alternate to lime due to the high lime content of the cement. The use of cement is particularly convenient if a large amount is to be added, as described hereinafter, to increase the strength of the set product or to decrease the setting temperature of the composition. About 5 to 10 pounds of lime, calculated as $Ca(OH)_2$, is usually preferred, whether the source is quicklime, slaked lime, or cement.

LIGNOSULFONATES

In the preparation of most lime base muds, quebracho and lignites are alternates to the lignosulfonates as breakover materials. In the preparation of settable drilling fluids, however, it has been found that quebracho and the lignites are actually detrimental if present in an amount greater than about one-half pound per barrel. The materials are objectionable since they accelerate gelation of the composition, thus preventing placement of the composition in deep wells before setting occurs. Up to about one pound per barrel of these materials can sometimes be tolerated but their complete absence is desirable. The function of the lignosulfonates is threefold. First, it acts in its usual capacity as a breakover material in the preparation of the lime base drilling fluid. Second, lignosulfonates delay the action of the quicklime permitting placement of the composition in the well before sufficient heat develops to set the composition. Third, when cement is employed in the composition the lignosulfonates kill the set of the cement so that, even after two months, the cement does not set by its usual hydration reactions.

At least 5 pounds per barrel of the lignosulfonates are generally employed although as low as 3 pounds have been used with some success where the clay, caustic and cement contents are near minimum values. About 7 to 8 pounds per barrel of drilling fluid generally are preferred. Up to about 10 pounds or more have been used without serious detrimental effects. The metallic portion of the lignosulfonate may be an alkali metal such as sodium or potassium or may be an alkaline earth metal such as calcium, magnesium, barium or the like. The lignosulfonates may be prepared from the waste black liquor from the paper mills employing the sulfate process. The lignosulfonates are prepared from this black liquor by treatment with sulfur dioxide or a suitable sulfite. The preferred material for our invention is prepared from paper mill waste sulfite liquor. Suitable lignosulfonates can be recovered by simply evaporating this waste sulfite liquor. It is preferred, however, to recover a material of greater purity by treating the liquor with lime according to the Howard process as described in Industrial and Engineering Chemistry, volume 31, No. 11, November 1939, p. 1333. This purified material is available commercially under the trade-mark Kembreak. While the entire class of alkali and alkaline earth metal salts appears to be satisfactory, the purified calcium salts such as Kembreak are somewhat superior.

CAUSTIC

When the term "caustic" is employed, the term means either caustic soda (NaOH) or caustic potash (KOH) since either form is operable. Ammonium hydroxide should not be used since an explosion results when quicklime is added to a drilling fluid containing ammonia. The function of the caustic in the fluid is twofold. First, it aids in the breakover of the drilling fluid from sodium base to lime base. Second, it reacts with the silicate clays at high temperatures to cause gelation of the drilling fluid. The caustic should be employed in an amount corresponding to about 0.5 pound per barrel of drilling fluid in order to obtain an effective breakover. If effective breakover can be obtained with less caustic, use of as little as 0.3 pound per barrel is sometimes advisable. If the composition is to be employed in deep wells, not over one pound of caustic per barrel of drilling fluid should be used to prevent excessively rapid setting of the drilling fluid. Apparently, the reaction of the caustic with the silicates causes a somewhat earlier gelation than reaction of lime with the silicates. Thus, the quantity of caustic must be kept low in order to prevent excessively rapid gelation. It has also been noted that the caustic tends to destroy the effects of the boric acid and acetic acid added to retard hydration of the quicklime. Thus, in deep wells where the heating action is to be delayed by the addition of boric acid and acetic acid, the amount of caustic must be kept low to avoid destroying the effects of these materials. In shallow wells where no retarders are employed, other than the lignosulfonates, up to 1½ or 2 pounds per barrel of caustic may be employed. The preferred range is from about ½ to 1 or 1½ pounds per barrel of drilling fluid.

QUICKLIME

The principal function of the quicklime is to heat the composition to cause gelation by the formation of alkali and alkaline earth metal silicates. An additional function of the quicklime is to act as a source of calcium ion for reaction with clay solids. About 100 pounds of quicklime are normally employed per barrel of drilling fluid to supply the required heat. This serves as a very potent source of calcium ions. Obviously, by comparison, the usual 3 to 10 pounds of lime per barrel of lime base drilling fluid is insignificant. As a result, the temperatures of 300° F. to 350° F. required to cause gelation of some lime base muds are not required to set our composition. A temperature of about 250° F. is adequate to cause gelation of our composition. Theoretically, many chemicals which release heat upon hydration should be alternates to quicklime. However, as in the case of quicklime, other effects are present in addition to the heating effect. In addition, all other heating chemicals tested were found to develop heat so quickly that no time was available for placing the composition at the loss zone in a well. Therefore, it can be concluded that quicklime has no alternates in the composition.

The quicklime should be added in an amount sufficient to generate a temperature of about 250° F. The required temperature, and consequently the necessary quicklime, depends upon the amounts of caustic, calcium ion, cement and clay solids in the drilling fluid, since these are the materials which react to form a gel. The required temperature depends particularly upon the clay solids content of the composition. If only about 5 per cent clay solids are present, the temperature should be increased to about 260° F. to obtain effective gelation of the drilling fluid. If, on the other hand, the clay solids content approaches 20 to 25 per cent, a temperature as low as 220° F. may be adequate. The gelation temperature of a composition containing a high content of both clay solids and cement may be as low as 200° F. Thus, when the term "about 250° F." is employed hereinafter, it will be understood that the temperature may vary between about 200 to 260° F. depending upon variations in the composition. In terms of pounds of quicklime per barrel of drilling fluid the amount varies with the activity of the quicklime. If a fresh quicklime is to be employed in a drilling fluid having high clay solids content for use in a shallow well where the heat is to be permitted to develop quickly, as little as about 60 pounds of quicklime per barrel of drilling fluid can sometimes be used. If the lime is old and not very active, on the other hand, and if the clay solids content of the drilling fluid is low and the heat is to develop slowly in a deep well, then as much as about 150 pounds per barrel may be required. The lower limit is governed by failure of the quicklime to develop sufficient heat to cause gelation of the drilling fluid. The upper limit is set by too rapid development of heat, producing drilling fluid which is unpumpable because of high viscosity and gel strength. For most quicklimes and most conditions an amount of quicklime between about 80 and 120 pounds per barrel of drilling fluid is employed, about 100 pounds per barrel generally being preferred.

To determine if a quicklime is sufficiently active for use, a simple test is to stir a pound of quicklime into a gallon of water. The temperature rise should amount to about 60° F. in about 4 to 6 minutes. Quicklimes giving as little as 50° F. rise have been used with some success, but one giving a temperature rise of at least 55° F. should be selected, if possible. Quicklimes giving a temperature rise of at least 60° F. are available and are greatly preferred. A more direct test is to determine the amount of quicklime necessary to heat a gallon of the composition to be used to about 250° F. in approximately the desired placement time. An amount equal to 42 times this quantity is then employed per barrel of drilling fluid.

It will be apparent that the quicklime must be freshly added to the composition to be effective. The term "freshly added," when employed herein, means the time at which the quicklime is added so closely precedes the time at which the composition is placed opposite the loss zone, that a temperature of about 250° F. is developed in the composition, after placement, by hydration of the quicklime. In terms of hours, the term "freshly added" varies with conditions, but always means the lime is added within about 3 hours of the desired setting time, and usually within about 2 hours.

CEMENT

When the term "cement" is employed a cement of the Portland type is intended. The principal function of the cement is to impart greater strength to the set composition. It has been found that even in the absence of cement the composition develops gel strength of several thousand grams, as measured on the Stormer viscosimeter. This gel strength develops rapidly even while the composition is flowing, resulting in a resistance to shear which causes the composition to resist flow through the passages of the formations to which drilling fluids are being lost. The gel strength alone is normally sufficient to stop the flow completely. In subsequent drilling operations, however, it is desirable that the plugging material should have considerably greater strength to resist the tendency of high pressure surges to force the material out of the passages. The manner in which the cement acts to increase the strength of the resulting composition is not certain. It has been found that in a drilling fluid containing the cement the lignosulfonates prevent normal setting of the cement for a period of more than two months. Therefore, the increased strength imparted by the cement probably is not due to the usual hydration reactions. However, at elevated temperatures some hydration may occur or perhaps the silicates, particularly the aluminum silicates present in the cement, react at the high temperature with lime and caustic to give the higher strength.

The other function of the cement is to decrease slightly the temperature required to gel the composition. In order to obtain a good gel strength with cement-free mud, at least about 250° F. and preferably somewhat higher temperatures should be developed. This is particularly true if high strengths are required. With cement present in an amount of at least about 50 pounds per barrel of drilling fluid, however, a noticeable decrease in temperature required is observed. By using about 200 pounds of cement per barrel of drilling fluid the gelation temperature can be reduced by about 15 or 20 per cent to around 200 to 240° F. depending upon the amount of clay solids and caustic present. As indicated above, about 50 pounds per barrel of cement should be employed to obtain noticeable effects. About 150 to 250 pounds per barrel are generally employed. As much as 300 pounds of cement per barrel have been added without objectionable effects. Set cement has been ground and used as an alternate to unhydrated cement, but the unhydrated form is somewhat superior and much more conveniently available, and is therefore generally preferred.

STABILIZERS

The stabilizers are the boric acid and low molecular weight organic acids employed to delay the set or gelation of the composition by delaying the hydration of the quicklime. The theory of the function of these materials is uncertain, but apparently the stabilizing action is due to the action of the weak acids on the quicklime to give a temporary stability in water. The low molecular weight organic acid, such as acetic acid, acts quickly to prevent hydration of the lime, while the boric acid, being slowly soluble in water, acts gradually to extend the period of stability. The term "stabilizer" is employed to distinguish the action from that of normal set retarders since the action of the stabilizer apparently is to delay the heating action rather than to affect the setting properties of the composition.

Boric acid is the only operable slowly soluble acid tested to date, but other slowly soluble acids should also be operable. The boric acid may be used in any amount down to none at all, but in order to obtain noticeable results, at least about one pound should be employed per barrel of drilling fluid. More than 7 or 8 pounds of boric acid per barrel tends to dissipate the heat over too long a period of time and thus prevent setting. Between these limits, the preferred quantity depends on the amount of delay desired.

The low molecular weight organic acid may be acetic acid or other water soluble organic carboxylic acids such as propionic or even butyric. Acetic acid is preferred because of its high solubility, quick action, low cost and ready availability. As in the case of boric acid, the organic acid should be used in an amount of at least one pound per barrel for appreciable effects although the organic acid may be present in smaller amounts, or may be omitted altogether if desired. Concentrations of more than about 3 pounds of organic acid per barrel cause excessive thickening of the composition and hence should be avoided. The preferred amount when used alone is about 1 to 2 pounds per barrel.

Apparently the boric acid has a combination effect with acetic acid or its alternate since a greater delay is available with the combination than with either material alone. The concentrations preferred in combination for deep wells are about 1 pound of acetic acid and about 5 pounds of boric acid per barrel of drilling fluid.

METHOD OF PREPARATION AND USE

The drilling fluid is prepared in the well-known manner of producing lime base drilling fluids. Quicklime is added to the fluid through the hopper of a jet mixer. The degree of mixing has been found to control the setting or gelling time of the composition to some extent. Oddly enough, the more thorough the mixing the slower is the thickening rate. Thus, if the mixture is passed 16 times through the jet the composition has a setting time 40 to 50 per cent greater than if only 8 passes through the jet are employed for the mixing. After the quicklime is mixed in, the composition is spotted by suitable means such as a bailer, or preferably through open end drill pipe, at the location in the well where the loss of drilling fluid is occurring. The position of this zone may be determined by any suitable means, as by a temperature survey. Sufficient pressure is then imposed to force the batch slowly into the formation passages to which circulation is being lost. Since, unlike cement slurries, shear resistance develops rapidly even while the composition is being pumped, resistance to shear and flow develops and the preparation seals the passages through which it is flowing. In some cases the position of the loss zone need not be determined since the settable drilling fluid will naturally follow the normal drilling fluid into the loss passages in the formation. In most cases, however, the location of the loss zone should be determined.

If cement is used, it should be added after the drilling fluid is broken over to a lime base but before the quicklime is added. Regarding the stabilizers, the acetic acid should certainly be present before the quicklime is added in order that it can exert its stabilizing effect on the quicklime immediately. Therefore, it should be mixed in just prior to the addition of the quicklime. Since the boric acid exerts a delayed action, however, it may be added with the quicklime or even later. To obtain the combination effect of the stabilizers the boric acid and organic acid should both be mixed into the drilling fluid before addition of the quicklime. This is the normal procedure.

Our invention will be better understood from consideration of the following examples.

Example I

Lime base drilling fluids were prepared from a natural Gulf Coast mud weighing 9.7 pounds per gallon (containing about 20 per cent by weight clay solids). Five pounds of lime were added to convert the drilling fluid to a calcium base. The types and amounts of breakover chemicals and caustic are indicated in Table I. To these various lime base drilling fluids 100 pounds of quicklime were added per barrel of drilling fluids, and the mixtures were stirred slowly for 30 minutes to simulate the field practice of mixing the quicklime into the drilling fluids by pumping through a jet mixer. At the end of the stirring period the mixtures were placed in a Howco consistometer, described in U. S. Patent 2,122,765, Weiler, and the temperature was increased to simulate placing the settable mixtures in a 6000-foot well. The results are listed in Table I.

TABLE I

| No. | Breakover Chemical | | Caustic Soda, Lbs./Bbl. | Viscosity, Poises | |
|---|---|---|---|---|---|
| | Type | Lbs./Bbl. | | After Stirring | In Consistometer |
| 1 | Kembreak | 6 | 1 | Less than 1 | 10 in 25 min. |
| 2 | Carbonox | 6 | 2 | 4 | 10 in 52 min. |
| 3 | do | 8 | 3 | 4 | 10 in 48 min. |
| 4 | Quebracho | 3 | 2 | about 10 | |
| 5 | do | 6 | 4 | do | |

Kembreak is the trade-mark for a calcium lignosulfonate. Carbonox is the trade-mark for a lignite. It is apparent from the above data that quebracho drilling fluids could not be pumped to the desired location in a well. While the Carbonox drilling fluids were not quite so viscous, the gel strengths were very high, accordingly use of these preparations in any but very shallow wells would be difficult.

*Example II*

To delay the setting times of the drilling fluids, 5 pounds per barrel of boric acid and 1 pound per barrel of glacial acetic acid were mixed into drilling fluids, 1, 3 and 5 in Table I before the quicklime was added. Both drilling fluids 3 and 5 containing the stabilizers thickened so quickly upon addition of quicklime that they could not be stirred. Drilling fluid 1, containing the stabilizers, had a viscosity of about one poise after 30 minutes' stirring. The viscosity in the consistometer reached 10 poises in 1 hour and 25 minutes. When quebracho or Carbonox were employed as the breakover chemicals, it is apparent that the "stabilizers" acted as set accelerators. In the case where Kembreak was used as the breakover chemical, on the other hand, the gelling time was increased by a factor of three.

*Example III*

To determine the effect of cement on the composition, a lime base drilling fluid was prepared containing about 20 per cent by weight of clay solids. The drilling fluid was broken over to a lime base by adding about 8 pounds of unhydrated cement containing about 65 per cent lime, 10 pounds of Kembreak and ½ pound of caustic per barrel of drilling fluid. Various amounts of unhydrated Portland cement were stirred into separate samples of this drilling fluid. Quicklime was then added in an amount equal to about 100 pounds per barrel of the compoistion including the cement. The quicklime was stirred into the mixture for 30 minutes and then poured into molds for testing. The resulting 2-inch cubes were allowed to set under moist conditions at atmospheric temperature for 24 hours. They were then tested for compressive strength in a hydraulic press. The results are presented in Table II.

TABLE II

| Amount of Cement Added, Lbs./Bbl. | Compressive Strength, Lbs./Sq. In. |
|---|---|
| 0 | Less than 50. |
| 100 | 190. |
| 200 | 380. |
| 300 | 510. |

The amounts of cement are based on the drilling fluid before addition of the cement. The additional strength imparted by the cement is apparent.

*Example IV*

A settable drilling fluid was prepared containing a water base, about 18 per cent by weight of clay solids, and about 8 pounds of Kembreak, 0.8 pound of caustic soda, and 160 pounds of unhydrated Portland cement per barrel of drilling fluid. To this composition 80 pounds of quicklime were added, per barrel of the composition, through the hopper of a jet mixer. The composition was then circulated 8 times through the mixer. Two samples were then taken and placed in cups of Stormer-type viscosimeters. One one sample the viscosity was measured over a period of time while the rotor was turning at 600 R. P. M. On the other sample the gel strength was measured from time to time. Another pair of samples was taken after 16 passes through the jet mixer and the viscosity and gel strength were measured in the same way. The results of the viscosity tests are presented in Table III and compared to data obtained on samples of an ordinary Portland cement slurry and a slurry of Portland cement containing about 16 per cent bentonite by weight. Gel strength data are presented in Table IV.

TABLE III.—VISCOSITIES OF SAMPLES, POISES

| Sample | Age of Sample, Minutes | | | | | | | | |
|---|---|---|---|---|---|---|---|---|---|
| | 30 | 35 | 40 | 45 | 50 | 55 | 60 | 65 | 70 |
| Settable Mud, 8 passes | 1.6 | 2.1 | 2.6 | 6.6 | 20 | | | | |
| Settable Mud, 16 passes | 1.2 | 1.3 | 1.5 | 1.7 | 2.0 | 2.5 | 3.4 | 7.2 | 20 |
| Portland Cement | 1.2 | 1.1 | 1.1 | 1.1 | 1.1 | 1.1 | 1.1 | | |
| Cement and Bentonite | 2.6 | 2.5 | 2.3 | 2.2 | 2.1 | 2.0 | 1.9 | | |

TABLE IV.—GEL STRENGTHS OF SAMPLES, KILOGRAMS

| Sample | Age of Sample, Minutes | | | | | |
|---|---|---|---|---|---|---|
| | 15 | 30 | 45 | 60 | 90 | 120 |
| Settable Mud, 8 passes | 0.3 | 1.9 | 8.0 | | | |
| Settable Mud, 16 passes | 0.2 | 0.3 | 0.6 | 2.8 | 9.0 | |
| Portland Cement | 0.1 | 0.1 | 0.1 | 0.1 | 0.4 | 0.8 |
| Cement and Bentonite | 0.5 | 0.6 | 0.6 | 0.7 | 0.8 | 1.0 |

The data in Table III illustrate clearly that while Portland cement with or without bentonite will not develop a high viscosity while moving rapidly, the settable mud will develop a high viscosity even when being stirred at 600 R. P. M. in a Stormer viscosimeter. The data also demonstrate that the time at which a high viscosity develops can be extended by increasing the degree of mixing, the time being increased by about 50 per cent by using 16 passes through the mixer rather than only 8. It should also be noted that use of more than about 16 passes may prevent gelation of the composition. Therefore, more than 10 or 12 passes should rarely be used.

The results presented in Table IV illustrate the failure of Portland cement slurries to develop an appreciable gel strength in less than two hours, while the settable mud, after 8 passes through the jet mixer develops a strong gel in only 45 minutes. The time required to develop a high gel strength can obviously be extended by more thorough mixing, although the use of stabilizers is more convenient and avoids the danger that excessive mixing may prevent gelation.

*Example V*

To determine the effects of boric acid and acetic acid as stabilizers a drilling fluid was prepared containing about 18 per cent by weight of clay solids, and about 8 pounds of Kembreak, about ½ pound of caustic soda and about 160 pounds of Portland cement per barrel of drilling fluid. The amounts of stabilizing acids indicated in Table V were mixed into sepaarte samples of this drilling fluid. Quicklime was then added to the samples in an amount equal to about 100 pounds per barrel of drilling fluid and the mixtures were stirred by a low speed stirrer for about 30 minutes. The samples were then placed in a Howco consistometer and the viscosity measured over a period of time at simulated bottom-hole conditions for a 6000-foot well. The times at which the mixtures started to stiffen, and the times at which the samples developed viscosities of 100 poises are indicated in Table V.

TABLE V

| Stabilizer, Lbs./Bbl. | Start to Stiffen Time, Minutes | 100 Poise Time, Minutes | Remarks |
|---|---|---|---|
| None | 17 | 28 | |
| ½ Acetic Acid | 20 | 25 | |
| 1 Acetic Acid | 35 | 40 | Mud very thick. |
| 3 Acetic Acid | 43 | 47 | |
| 1 Boric Acid | 22 | 34 | |
| 3 Boric Acid | 33 | 45 | |
| 5 Boric Acid | 40 | 58 | |
| 10 Boric Acid | 50 | 105 | Weak—set too slow. |
| ½ Acetic, 5 Boric Acid | 45 | 62 | |
| 1 Acetic, 5 Boric Acid | 53 | 66 | |
| 1 Acetic, 3 Boric Acid | 39 | 54 | |

Example VI

To demonstrate the ability of the composition to seal large passages a 6-inch steel pipe was plugged in the following manner.

A 12-foot section of steel pipe was placed in a horizontal position in a water bath. The bath was maintained at 115° F. to simulate the temperature of a formation at a depth of about 6000 feet. To one end of the horizontal pipe an open-end 2-inch pipe riser was attached to exclude the water of the water bath. To the other end a vertical 15-foot section of 6-inch pipe was attached. The vertical pipe was jacketed and maintained at about 100 to 120° F. to simulate well temperatures. This apparatus was filled with an ordinary clay mud.

A settable drilling fluid was prepared containing about 20 per cent by weight of clay solids, and about 7.5 pounds of Kembreak, about 0.4 pound of caustic, and about 150 pounds of Portland cement per barrel of drilling fluid. Just before pumping this composition into the apparatus described, about 4 pounds of boric acid, about 0.8 pound of glacial acetic acid, and about 100 pounds of quicklime per barrel of the drilling fluid were mixed into the drilling fluid by circulating the mixture about 8 times through a jet. About 35 gallons of this composition were placed in the vertical pipe and allowed to stand for 1 hour to simulate placement time in a well. The settable composition was then displaced into the horizontal pipe by pumping about 27 gallons of clay mud into the top of the vertical pipe. After 30 minutes the pump was started slowly and caused the settable composition to flow through the horizontal pipe at a pump pressure of about 100 p. s. i. After about 7 gallons had been pumped, and while the composition was still flowing, the pressure began to rise rapidly until a pressure of 400 p. s. i. was required to cause flow of the composition through the six-inch pipe. The pump was shut down at this time for safety reasons, some of the equipment not being designed for higher pressures. Examination of the horizontal pipe showed the cross section to be completely filled with set mud with no evidence of shrinkage or large channels.

From the above description and examples it will be apparent that we have accomplished the objects of our invention. A method and composition have been provided having properties highly desirable for use in stopping loss of circulation to formations penetrated by wells even though the passages in these formations are very large. This is accomplished by use of a composition which rapidly develops resistance to shear and flow while moving. In addition, means have been described for controlling the strength and gelling time of the composition.

We claim:

1. A composition for minimizing loss of drilling fluid to cavernous zones of a well during drilling operations comprising a pumpable line base drilling fluid and quicklime, said drilling fluid containing at least about 5 per cent by weight of clay solids, at least about 3 pounds of hydrated lime, from about 3 to 10 pounds of a lignosulfonate of a metal selected from the group consisting of alkali and alkaline earth metals, and from about 0.3 to 2 pounds of caustic per barrel of drilling fluid, and said quicklime being freshly added in an amount sufficient to heat the composition to about 250° F.

2. The composition of claim 1 in which said drilling fluid contains from zero to about 5 pounds of boric acid and from zero to about 2 pounds of a low molecular weight, water-soluble carboxylic acid per barrel of drilling fluid.

3. The composition of claim 1 in which said drilling fluid contains from about 50 to 250 pounds of unhydrated Portland-type cement per barrel of drilling fluid.

4. The composition of claim 3 in which said drilling fluid contains from zero to about 5 pounds of boric acid and from zero to about 2 pounds of a low molecular weight, water-soluble carboxylic acid per barrel of drilling fluid.

5. A composition for stopping loss of drilling fluids to cavernous zones of a well during drilling operations comprising a lime base drilling fluid and quicklime, said drilling fluid containing from about 7 to 25 per cent by weight of clay solids, from about 5 to 10 pounds of hydrated lime, from about 5 to 10 pounds of calcium lignosulfonate, and from about 0.3 to 1.5 pounds of caustic soda per barrel of said drilling fluid, and said quicklime being freshly added in an amount of about 80 to 120 pounds per barrel of drilling fluid.

6. The composition of claim 5 in which said drilling fluid contains from zero to about 5 pounds of boric acid, and from zero to about 2 pounds of acetic acid per barrel of drilling fluid.

7. The composition of claim 5 in which said drilling fluid contains from about 50 to 250 pounds of unhydrated Portland cement per barrel of drilling fluid.

8. The composition of claim 7 in which said drilling fluid contains from zero to about 5 pounds of boric acid, and from zero to about 2 pounds of acetic acid per barrel of drilling fluid.

9. A method for stopping loss of drilling fluid to cavernous zones of a well during drilling operations, a pumpable drilling fluid being available containing at least about 5 per cent by weight of clay solids, from about 3 to 10 pounds of hydrated lime, at least about 3 pounds of a lignosulfonate of a metal selected from the group consisting of alkali and alkaline earth metals, and from about 0.3 to 2 pounds of caustic per barrel of drilling fluid, the improvement comprising rapidly mixing into said drilling fluid about 80 to 120 pounds of quicklime per barrel of drilling fluid, introducing the mixture, while still pumpable, into the well opposite the zone to which drilling fluid is being lost, causing the mixture to flow into said zone, and maintaining said mixture in said zone until sufficient gel strength develops to resist further loss of drilling fluid to said zone.

10. A method for plugging passages in formations penetrated by a well, through which passages drilling fluid is being lost, comprising introducing into the well opposite said passages a mixture of a drilling fluid and quicklime, said drilling fluid containing from about 7 to 25 per cent by weight of clay solids, from about 5 to 10 pounds of hydrated lime, from about 5 to 10 pounds of calcium lignosulfonate, and from about 0.3 to 1.5 pounds of caustic soda per barrel of drilling fluid, and said quicklime being freshly added in an amount of about 80 to 120 pounds per barrel of drilling fluid, causing the mixture to flow into said passages, and maintaining the mixture in said passages until sufficient gel strength develops to resist further loss of drilling fluid to the formations through said passages.

References Cited in the file of this patent

UNITED STATES PATENTS

| | | |
|---|---|---|
| 2,193,144 | Rymal | Mar. 12, 1940 |
| 2,213,038 | David | Aug. 27, 1940 |
| 2,213,039 | David | Aug. 27, 1940 |
| 2,491,436 | Barnes | Dec. 13, 1949 |
| 2,491,437 | Perkins | Dec. 13, 1949 |